United States Patent
Liu

(10) Patent No.: US 11,967,093 B2
(45) Date of Patent: Apr. 23, 2024

(54) LIGHT COLOR IDENTIFYING METHOD AND APPARATUS OF SIGNAL LIGHT, AND ROADSIDE DEVICE

(71) Applicant: Apollo Intelligent Connectivity (Beijing) Technology Co., Ltd., Beijing (CN)

(72) Inventor: Bo Liu, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 380 days.

(21) Appl. No.: 17/366,838

(22) Filed: Jul. 2, 2021

(65) Prior Publication Data

US 2021/0334559 A1    Oct. 28, 2021

(30) Foreign Application Priority Data

Dec. 3, 2020   (CN) .......................... 202011397761.7

(51) Int. Cl.
   *G06T 7/254*    (2017.01)
   *G06T 7/194*    (2017.01)
   *G06V 20/58*    (2022.01)

(52) U.S. Cl.
   CPC .............. *G06T 7/254* (2017.01); *G06T 7/194* (2017.01); *G06V 20/584* (2022.01)

(58) Field of Classification Search
   CPC ........ G06T 7/254; G06T 7/194; G06V 20/584
   (Continued)

(56) References Cited

U.S. PATENT DOCUMENTS

2008/0111789 A1* 5/2008 Young .................... G06V 10/17
                                                                    345/157
2014/0327529 A1* 11/2014 Hsu ........................ G08C 17/02
                                                                    340/12.54
(Continued)

FOREIGN PATENT DOCUMENTS

CN       109145678 A       1/2019
CN       110992725 A       4/2020
(Continued)

OTHER PUBLICATIONS

Notice of Reasons for Refusal of corresponding Japanese Patent Application No. 2021-111836, dated Jul. 27, 2022, 12 bages.
(Continued)

*Primary Examiner* — Gabriel I Garcia
(74) *Attorney, Agent, or Firm* — Tucker Ellis LLP

(57) ABSTRACT

A light color identifying method and apparatus of a signal light, and a roadside device provided in the present application relate to the field of intelligent transportation. A solution includes: collecting an image including the signal light through an image collecting apparatus; determining a background image according to N preceding frames of images of a current frame of image, where N is a positive integer greater than or equal to 1; performing foreground identification on the current frame of image according to the background image to obtain a moving foreground, where the moving foreground represents a change of the current frame of image relative to the background image; and determining, according to the moving foreground, a light color of a light that is turned on in the current frame of image.

14 Claims, 12 Drawing Sheets

(58) Field of Classification Search
USPC .......................................................... 382/104
See application file for complete search history.

(56) References Cited

U.S. PATENT DOCUMENTS

| | | | |
|---|---|---|---|
| 2015/0220789 A1* | 8/2015 | Wood | ...................... G06T 7/246 |
| | | | 382/103 |
| 2017/0083790 A1* | 3/2017 | Risinger | ................. G06T 7/254 |
| 2020/0106942 A1 | 4/2020 | Jiang | |

FOREIGN PATENT DOCUMENTS

| | | |
|---|---|---|
| CN | 111428663 A | 7/2020 |
| JP | 2000-353292 A | 12/2000 |
| JP | 2011170539 A | 9/2011 |
| JP | 2015-207035 A | 11/2015 |
| JP | 2017-022492 A | 1/2017 |
| KR | 10-2005-0114916 A | 12/2005 |
| KR | 10-2017-0092376 A | 8/2017 |
| WO | 2008/038370 A1 | 4/2008 |

OTHER PUBLICATIONS

Office Action of corresponding Korean Application No. 10-2021-0087961, dated Dec. 13, 2022, 18 pages.
European Search Report dated Dec. 8, 2021 for Application Serial No. 21183715.8.
Office Action of corresponding Chinese Application No. 202011397761.7, dated Dec. 18, 2023, 14 pages.

* cited by examiner

LIGHT COLOR IDENTIFYING METHOD AND APPARATUS OF SIGNAL LIGHT, AND ROADSIDE DEVICE

CROSS-REFERENCE TO RELATED APPLICATIONS

This application claims priority to Chinese Patent Application No. 202011397761.7, filed on Dec. 3, 2020, which is hereby incorporated by reference in its entirety.

TECHNICAL FIELD

The present application relates to the field of intelligent transportation in image processing technologies and, in particular, to a light color identifying method and apparatus of a signal light, and a roadside device.

BACKGROUND

Signal lights can be seen everywhere in life, where a signal light includes multiple light holders. For example, a traffic light includes three light holders.

In some application scenarios, light color identification is necessary for the signal light, for example, in the field of intelligent transportation, light color identification is necessary for the traffic light, as a result, a broadcast may be made to remote vehicles based on an identified light color so that these vehicles render route planning in advance.

At present, light color identifying methods includes a signal machine-based identifying method and a neural network-based identifying method. However, the signal machine-based identifying method requires a modification to the signal light in itself, which is relatively inconvenient; whereas the neural network-based identifying method requires a large amount of data to train the neural network, meanwhile a neural network inference process requires powerful computation of a processor and is time-consuming.

SUMMARY

The present application provides a light color identifying method and apparatus of a signal light, and a roadside device, which are used to provide a simple and easily implementable light color identifying solution.

According to a first aspect of the present application, provided is a light color identifying method of a signal light, including:
collecting an image including the signal light through an image collecting apparatus;
determining a background image according to N preceding frames of images of a current frame of image, where N is a positive integer greater than or equal to 1;
performing foreground identification on the current frame of image according to the background image to obtain a moving foreground, where the moving foreground represents a change of the current frame of image relative to the background image; and
determining, according to the moving foreground, a light color of a light that is turned on in the current frame of image.

According to a second aspect of the present application, provided is a light color identifying apparatus of a signal light, including:
a collecting unit, configured to collect an image including the signal light through an image collecting apparatus;
a background determining unit, configured to determine a background image according to N preceding frames of images of a current frame of image, where N is a positive integer greater than or equal to 1;
an identifying unit, configured to perform foreground identification on the current frame of image according to the background image to obtain a moving foreground, where the moving foreground represents a change of the current frame of image relative to the background image; and
a light color determining unit, configured to determine, according to the moving foreground, a light color of a light that is turned on in the current frame of image.

According to a third aspect of the present application, provided is an electronic device including:
at least one processor; and
a memory communicatively connected to the at least one processor;
where the memory has stored therein instructions executable by the at least one processor, and the instructions are executed by the at least one processor to enable the at least one processor to execute the light color identifying method of the signal light as described in the first aspect.

According to a fourth aspect of the present application, provided is a non-transitory computer readable storage medium having stored therein computer instructions for causing a computer to execute the light color identifying method of the signal light as described in the first aspect.

According to a fifth aspect of the present application, provided is a roadside device including the electronic device as described in the third aspect.

The present application provides the light color identifying method and apparatus of the signal light, and the roadside device, including: collecting an image including the signal light through an image collecting apparatus; determining a background image according to N preceding frames of images of a current frame of image, where N is a positive integer greater than or equal to 1; performing foreground identification on the current frame of image according to the background image to obtain a moving foreground, where the moving foreground represents a change of the current frame of image relative to the background image; and determining, according to the moving foreground, a light color of a light that is turned on in the current frame of image. According to the light color identifying method and apparatus of the signal light, and the roadside device provided in the present application, by means of identifying the foreground in the image, a light color identification problem may be converted into a foreground identification problem, so that the light color of the signal light can be identified without modifying the signal light or collecting a large amount of data for model training.

It should be understood that the content described in this section is not intended to identify a key feature or an important feature in an embodiment of present application, nor is it intended to limit the scope of the present application. Other features of the present application will become readily comprehensible with the following description.

BRIEF DESCRIPTION OF DRAWINGS

The accompanying drawings are used to better understand the present solution, rather than constituting a limitation to the present application. Where.

DESCRIPTION OF EMBODIMENTS

Exemplary embodiments of the present application will be described hereunder with reference to the accompanying drawings, which include therein various details of the embodiments of the present application to facilitate understanding and should be considered as to be merely exemplary. Therefore, those of ordinary skilled in the art should realize that various changes and modifications can be made to the embodiments described herein without departing from the scope and spirit of the present application. Likewise, for clarity and conciseness, descriptions of well-known functions and structures are omitted in the following description.

Signal lights are provided in many application scenarios, where a signal light can play a guiding role. By means of identifying a light color of the signal light, a guiding function may be more easily achieved. For example, in the field of intelligent transportation, by means of identifying the light color of the signal light, red light running detection and other services are possible; also, a current signal light's status may be broadcast to remote vehicles so that these vehicles render route planning in advance.

Figure 1A:
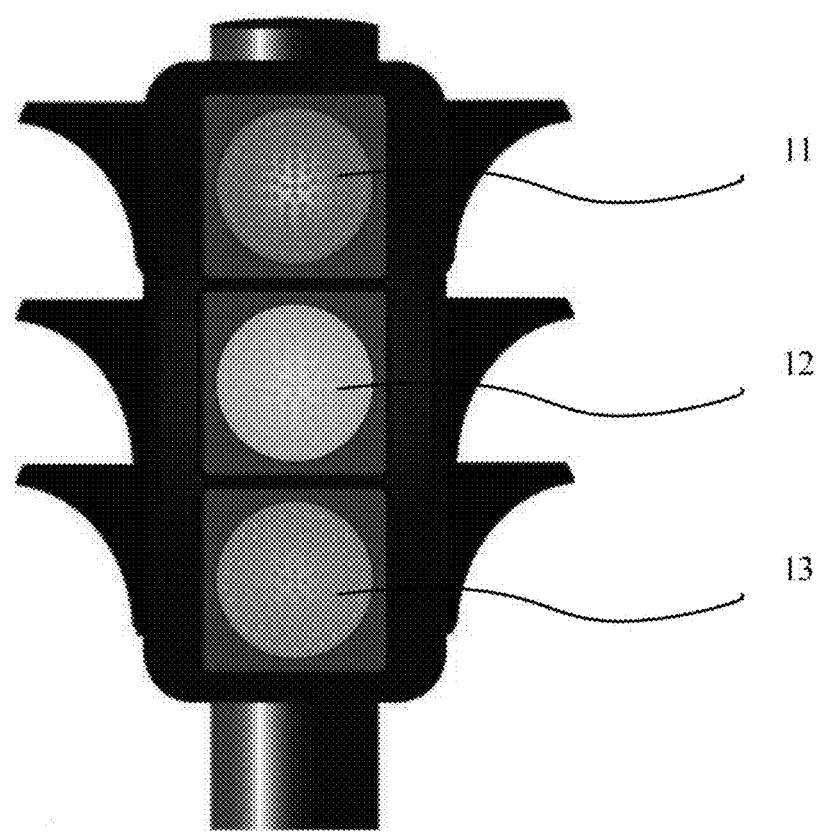
FIG. 1A is a signal light according to an exemplary embodiment.
Figure 1B:
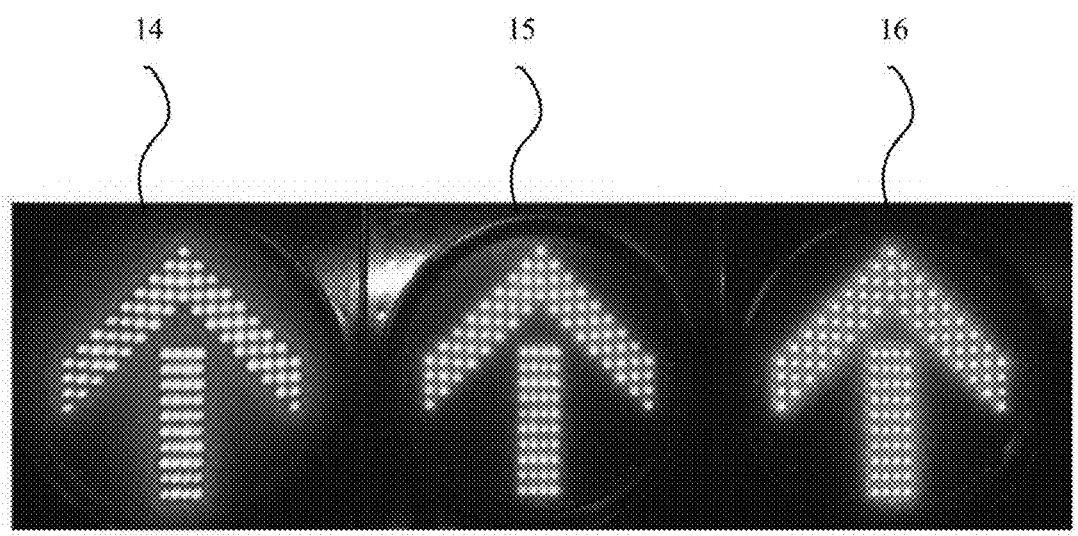
FIG. 1B is a signal light according to another exemplary embodiment.

FIG. 1A is a signal light according to an exemplary embodiment. As shown in FIG. 1A, this signal light includes a red light 11, a yellow light 12, and a green light 13. FIG. 1B is a signal light according to another exemplary embodiment. As shown in FIG. 1B, this signal light includes an indicator light 14 of a first color, an indicator light 15 of a second color, and an indicator light 16 of a third color.

The signal light shown in FIG. 1A or FIG. 1B may be identified to determine a light color of a light that is turned on currently in the signal light, so that guiding may be performed according to the light color of the signal light.

Light color identifying methods include a signal machine-based identifying method and a neural network-based identifying method.

However, the signal machine-based identifying method requires adding auxiliary hardware to a signal machine and detecting high and low levels of the signal machine to achieve the purpose of identifying the light color of the signal light. Therefore, this method requires a modification to the signal light itself, which is relatively inconvenient.

The neural network-based identifying method requires collecting a large number of training data, then training model, and finally performing light color identification through the trained model. Therefore, this method requires a large amount of data to be collected, which is relatively inconvenient; moreover, it requires powerful computation and is time-consuming to identify the light color through the model.

In order to solve the above-mentioned technical problem, the method provided in the present application may allow for: processing multiple consecutive frames of images including a signal light to identify a background image, then identifying a current frame of image according to the background image, determining a moving foreground, and finally determining, according to the determined moving foreground, a light color of a light that is turned on in the current frame of image.

Figure 2:
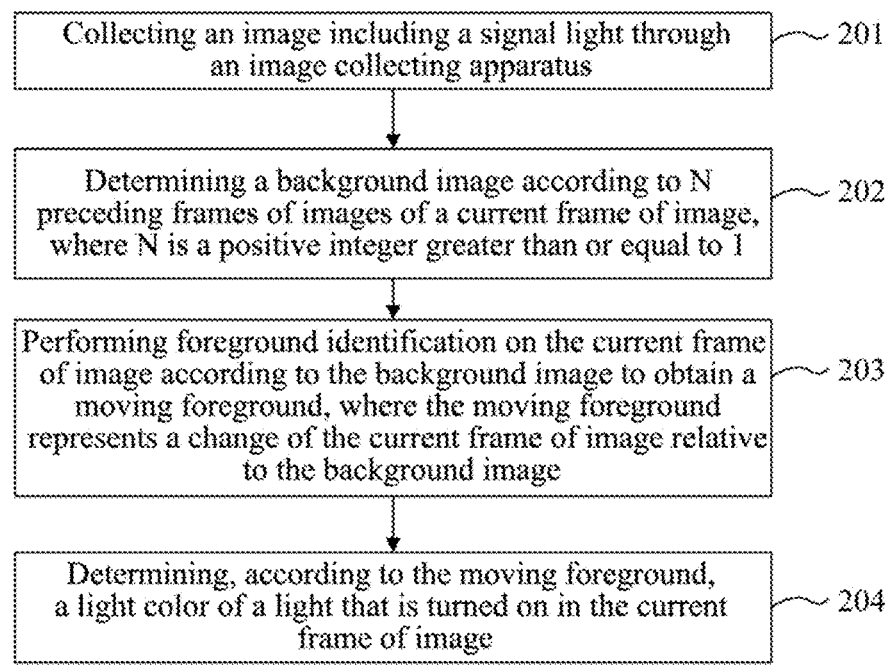
FIG. 2 is a flowchart of a light color identifying method of a signal light according to an exemplary embodiment of the present application.

FIG. 2 is a flowchart of a light color identifying method of a signal light according to an exemplary embodiment of the present application.

As shown in FIG. 2, the light color identifying method of the signal light provided in the present application includes:

Step 201, collecting an image including a signal light through an image collecting apparatus.

Where the method provided in the present application may be executed by an electronic device with computing capabilities, such as a computer, a smart phone, a roadside device, etc. The roadside device may be provided on a road side, for example, installed near a road provided with traffic lights. The execution subject of each embodiment in the present application may also be a server device connected to a roadside computing device, or a server device directly connected to a roadside sensing device, etc.; where the server device in the present application is, for example, a cloud control platform, a vehicle-road collaborative management platform, a central subsystem, an edge computing platform, a cloud computing platform, etc.

Specifically, an image collecting apparatus may also be provided near the signal light, so that the image collecting apparatus is used to capture an image of the signal light. The image collecting apparatus may be a camera though which consecutive images including the signal light may be collected.

Further, the image collecting apparatus may transmit the captured image to the electronic device for executing the method provided in this embodiment, and the electronic device performs processing of light color identification according to the received image.

Figure 3A:
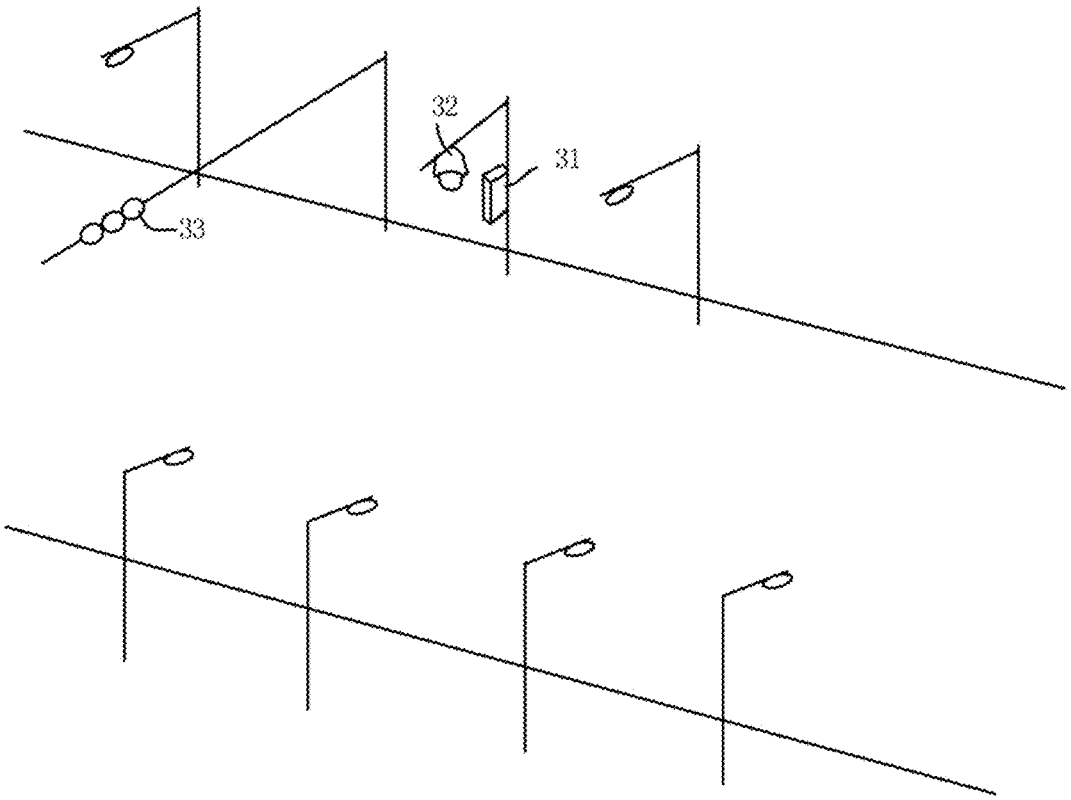
FIG. 3A is a diagram of an application scenario according to an exemplary embodiment of the present application.

FIG. 3A is a diagram of an application scenario according to an exemplary embodiment of the present application.

As shown in FIG. 3A, a roadside device 31 may be provided on a road side, the roadside device 31 is connected to an image collecting apparatus 32, and the image collecting apparatus 32 may capture an image of a signal light 33.

In an implementation, the image collecting apparatus 32 may be adjusted with regards to its capturing parameter and capturing angle so that it can capture an image that only includes the signal light 33.

Figure 3B:
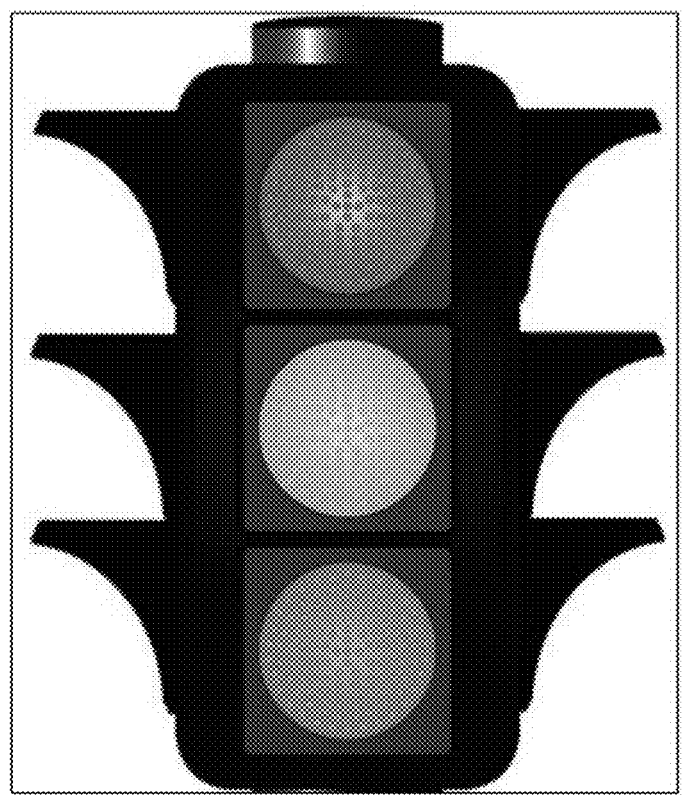
FIG. 3B is a schematic diagram of an image collected through an image collecting apparatus according to an exemplary embodiment of the present application.

FIG. 3B is a schematic diagram of an image collected through an image collecting apparatus according to an exemplary embodiment of the present application.

The image collecting apparatus 32 may collect the image as shown in FIG. 3B, and transmit the image to the roadside device 31. The roadside device 31 may directly perform processing of light color identification on the received image.

Figure 3C:
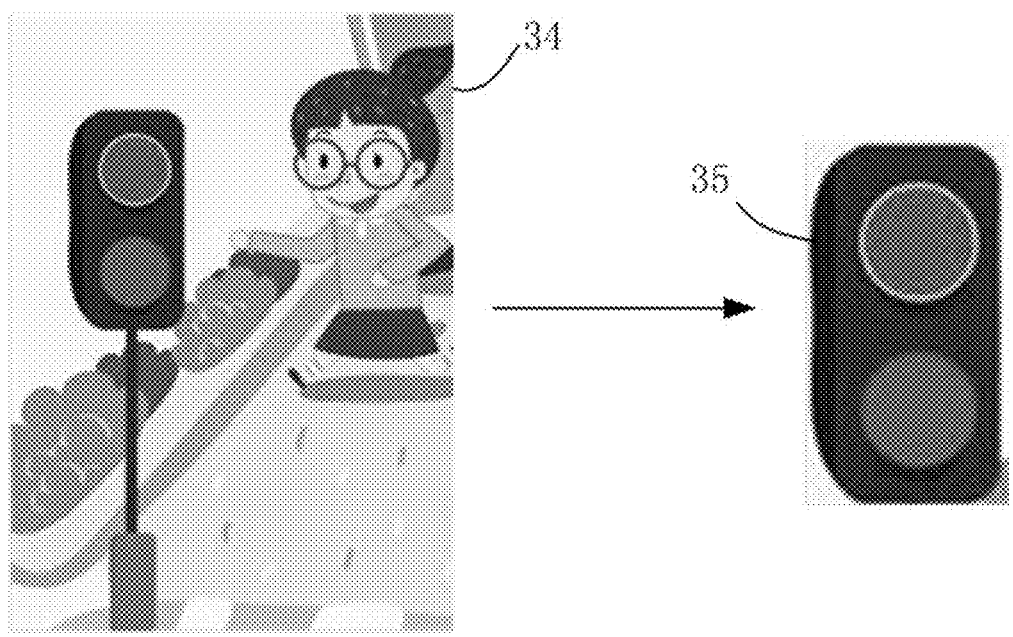
FIG. 3C is a schematic diagram of an image collected through an image collecting apparatus according to another exemplary embodiment of the present application.

FIG. 3C is a schematic diagram of an image collected through an image collecting apparatus according to another exemplary embodiment of the present application.

The image collecting apparatus 32 may collect an image as indicated by 34 shown in FIG. 3C, and transmit an image 34 to the roadside device 31.

The area in which the signal light is located may be pre-marked; and the roadside device 31 may perform processing of cropping on the received image 34 according to the pre-marked information to obtain an image which only includes the signal light and is indicated by 35, and perform processing of light color identification on the image.

Performing the processing of the light color identification on the image that only includes the signal light can avoid generation of interference to a light color identification result from a portion of the image other than the signal light.

In a vehicle-road collaborative system architecture for intelligent transportation, a roadside device includes a roadside sensing device and a roadside computing device, where the roadside sensing device (such as a roadside camera) is connected to the roadside computing device (such as a roadside computing unit RSCU), and the roadside computing device is connected to a server device which may communicate with an autonomous driving or assisted driving vehicle in various ways. In another system architecture, the roadside sensing device itself includes a computing function, then the roadside sensing device is connected directly to the server device. The above connection may be wired or wireless. In the present application, the server device is, for example, a cloud control platform, a vehicle-road collaborative management platform, a central subsystem, an edge computing platform, a cloud computing platform, etc.

Step 202, determining a background image according to N preceding frames of images of a current frame of image, where N is a positive integer greater than or equal to 1.

In a practical application, the electronic device may perform background modeling according to consecutive frames of collected images to determine the background image. For example, the electronic device may perform background modeling according to N frames of images so as to obtain an image background according to these images.

Where the background image may be determined according to pixel information of each pixel in the N frames of images. For example, if a same pixel in the N frames of images has a same pixel value, the pixel may be identified as a pixel belonging to the background image.

Specifically, pixels belonging to the background image are combined to form the background image. For example, when the signal light is in an off state, there will be no change in the light color of each light holder. In this case, the area in which the entire signal light is located will be determined as the background image. If only the signal light is included in the image, the entire image will be identified as a background.

Further, the determined background image may be used to perform foreground identification on the current frame of image collected. For example, a background image may be determined according to the N frames of images consecutively collected, and then the background image may be used to perform foreground identification on an $N+1^{-th}$ frame of image.

In a practical application, the current frame of image refers to an image for which a light color needs to be identified. After the electronic device collects a frame of image, a background image may be determined based on latest N frames of images collected, and then a next frame of image to be collected (the current frame of image) is performed with foreground identification according to the determined background image.

Figure 3D:
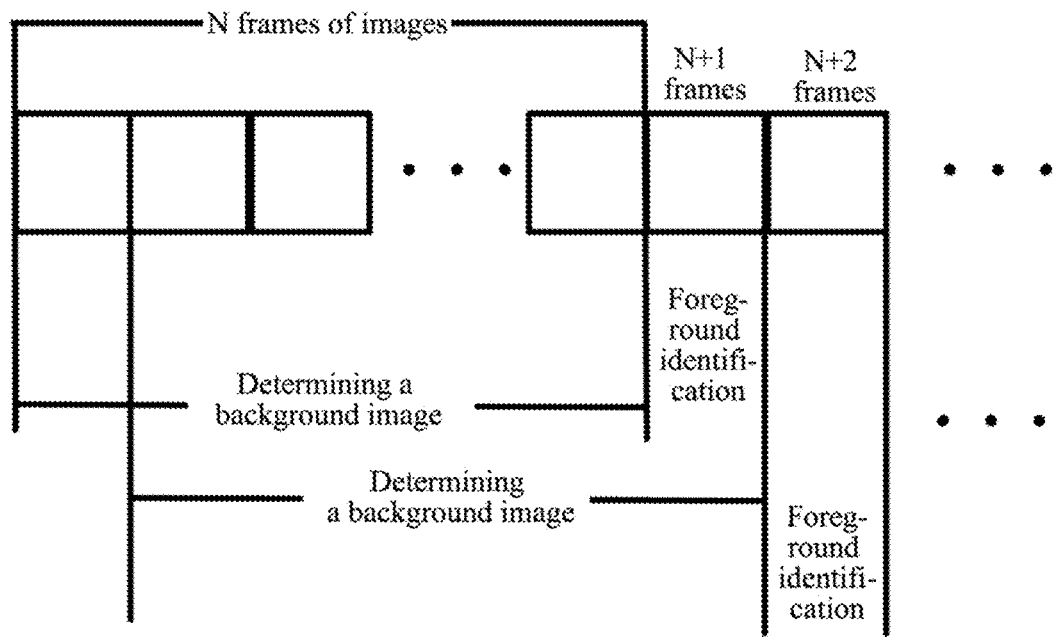
FIG. 3D is a flowchart of image processing according to an exemplary embodiment of the present application.

FIG. 3D is a flowchart of image processing according to an exemplary embodiment of the present application.

As shown in FIG. 3D, after the roadside device collects N frames of images, a background image may be determined according to the N frames of images, and then an $N+1^{-th}$ frame of image is performed with foreground identification according to the background image. Thereafter, the roadside device determines a background image based on latest N frames of images collected (a $2-N+1^{-th}$ frame of image), and then a latest $N+2^{-th}$ frame of image received is performed with foreground identification according to the background image.

Step 203, performing foreground identification on the current frame of image according to the background image to obtain a moving foreground, where the moving foreground represents a change of the current frame of image relative to the background image.

Specifically, the current frame of image may be compared with the background image, and pixels whose pixel values are inconsistent with the background image are regarded as pixels belonging to the moving foreground. These pixels belonging to the moving foreground constitute the moving foreground.

The moving foreground may also be determined by an algorithm for background identification. For example, the background image may be determined according to a vibe algorithm, and a foreground image in the current frame of image may also be determined based on the vibe algorithm.

Background and foreground are relative concepts. Taking the signal light as an example, for example, when the red light holder is turned on for a long time, the area in which the red light holder is located will be identified as a part of the background image. When the red light holder changes from on to off, the red light holder will be identified as a part of the foreground.

Figure 3E:
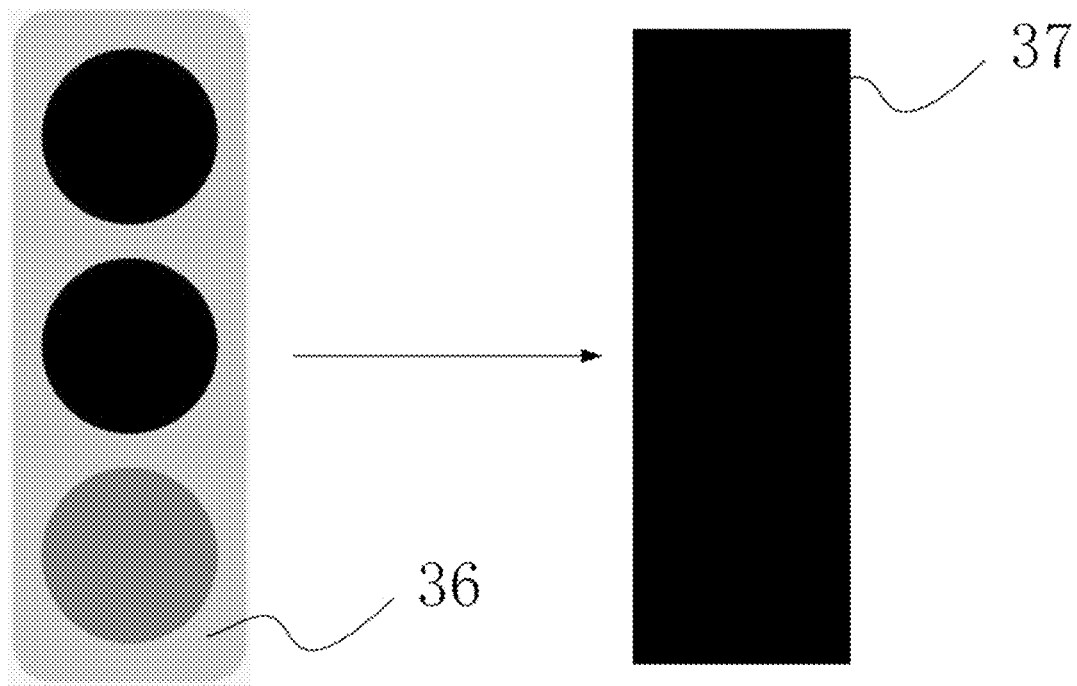
FIG. 3E is a schematic diagram of a foreground identifying result according to an exemplary embodiment of the present application.

FIG. 3E is a schematic diagram of a foreground identifying result according to an exemplary embodiment of the present application.

As shown by 36 indicated in FIG. 3E, during a period of t1-t2, the green light holder of the signal light is always on, and other light holders are in an off state. In this case, each pixel in the image is identified as a pixel belonging to the background image, and the identification result of the background image is indicated by 37 (black pixels represent pixels belonging to the background image).

Thereafter, the signal light is switched in color, and switched from green light on to yellow light on, where the green light changes from on to off, and the yellow light changes from off to on. There will be a change in pixel information of areas in which the two light holders are located. At this point, the area in which the green light holder is located and the area in which the yellow light holder is located will be identified as the foreground. Moreover, there is no change in the red light, therefore, the red light holder will still be identified as the background.

Step 204, determining, according to the moving foreground, a light color of a light that is turned on in the current frame of image.

Where a light color of a light that is turned on in the current frame of image may be determined according to the moving foreground identified in this frame of image.

Specifically, in the solution provided in the present application, light color identification is converted to moving foreground identification, thereby reducing the amount of data to be processed in the light color identification process.

Further, if the light color of the signal light changes, the area where the light color of the light holder changes may be identified as a moving foreground. For example, if a light holder changes from on to off, or from off to on, the light holder may be identified as a moving foreground. The light color of the light that is turned on in the current frame of image may be determined according to the light holder whose light color changes.

For example, if a moving foreground corresponding to one light holder area is identified in the current frame of image, it may be directly considered that the light color of the light that is turned on in the current frame of image is the light color corresponding to the light holder. For example, if the determined background image is an area outside the green light holder of the signal light and a moving foreground obtained by identifying the current frame of image according to the background image is an area where the yellow light holder is located, it can be considered that a moment where the green light and the yellow light are turned on simultaneously is captured in the current frame of image. Since the yellow light is turned on after the green light is turn off, it can be considered that the light color of the light that is turned on in the current frame of image is yellow.

For another example, if it is determined that the entire image including the signal light is a background image and no foreground image is identified in the current frame of image according to the background image, it can be considered that no light holder has a light color change in the current frame of image. Therefore, the light color of the light that was turned on in a preceding frame of image may be determined as the light color of the light that is turned on in the current frame of image.

According to the solution provided in the present application, a background image can be determined through multiple frames of images, and a moving foreground may be identified in a current frame of image according to the background image. Through this identification method, the area where the light color changes can be identified in the current frame of image, and then the current light color is determined. According to the solution provided in the present application, the light color of the signal light can be identified in real time without modifying the signal light or collecting data for model training, thereby solving the problem in the prior art.

The method provided in the present application is used to identify a light color of a signal light. The method is executed by a device provided with the method provided in this embodiment, and the device is generally implemented by means of hardware and/or software.

The light color identifying method of the signal light provided in the present application includes: collecting an image including the signal light through an image collecting apparatus; determining a background image according to N preceding frames of images of a current frame of image, where N is a positive integer greater than or equal to 1; performing foreground identification on the current frame of image according to the background image to obtain a moving foreground, where the moving foreground represents a change of the current frame of image relative to the background image; and determining, according to the moving foreground, a light color of a light that is turned on in the current frame of image. According to the method provided in the present application, by means of identifying the foreground in the image, a light color identification problem may be converted into a foreground identification problem, so that the light color of the signal light can be identified without modifying the signal light or collecting a large amount of data for model training.

Figure 4:
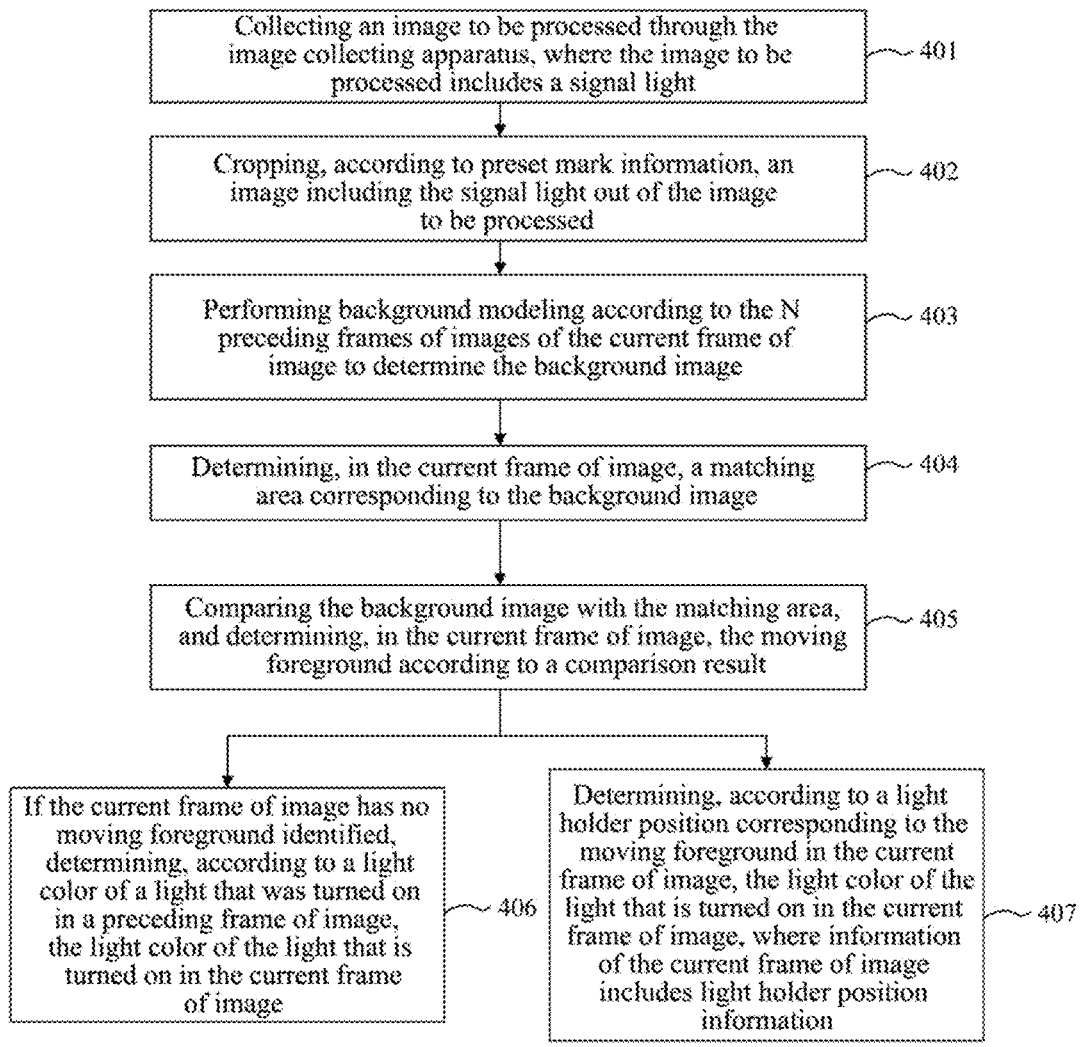
FIG. 4 is a flowchart of a light color identifying method of a signal light according to another exemplary embodiment of the present application.

FIG. 4 is a flowchart of a light color identifying method of a signal light according to another exemplary embodiment of the present application.

As show in FIG. 4, the light color identifying method of the signal light provided in the present application includes:

Step 401, collecting an image to be processed through the image collecting apparatus, where the image to be processed includes a signal light.

Where the method provided in the present application may be executed by an electronic device with a computing function. The electronic device may be connected to an image collecting apparatus. The image collecting apparatus may be a camera, for example.

Specifically, the image collecting apparatus may capture an image to be processed, and transmit the image to be processed to the electronic device. The image collecting apparatus may be adjusted with regards to its capturing angle, so that the image to be processed that is captured by the image collecting apparatus includes a signal light.

Figure 5A:
FIG. 5A is a schematic diagram of an image to be processed according to an exemplary embodiment of the present application.

FIG. 5A is a schematic diagram of an image to be processed according to an exemplary embodiment of the present application.

As shown in FIG. 5A, the image collecting apparatus may capture an image to be processed, and transmit the image to be processed that is captured to the electronic device.

Step 402, cropping, according to preset mark information, an image including the signal light out of the image to be processed.

Further, if the image collecting apparatus does not change in position and the signal light does not change in position, then the position of the signal light in the image to be processed that is collected by the image collecting apparatus will not change. Therefore, mark information may be preset to mark the area of the signal light in the image to be processed.

Figure 5B:
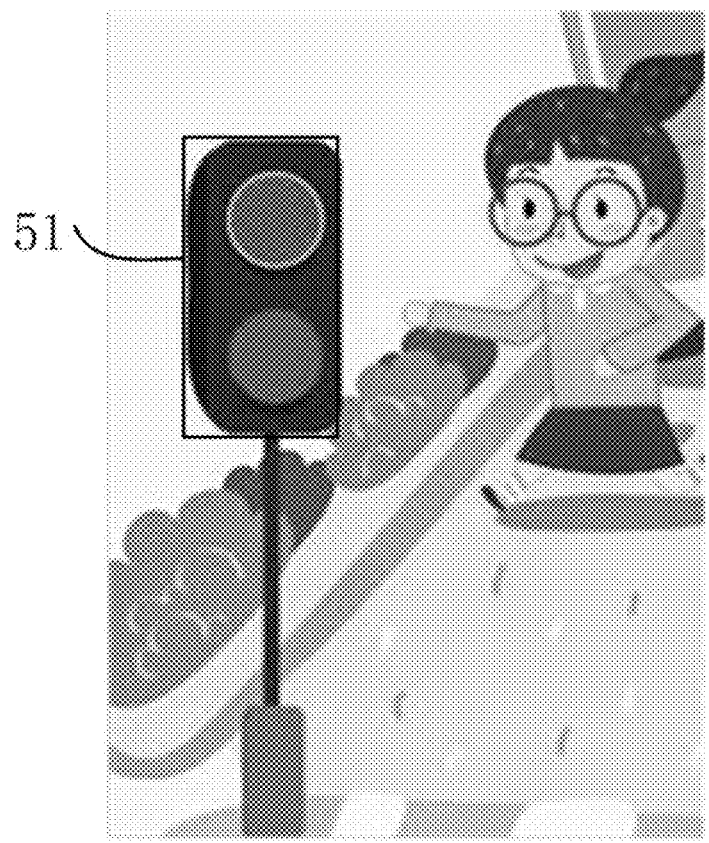
FIG. 5B is a schematic diagram of preset mark information according to an exemplary embodiment of the present application.

FIG. 5B is a schematic diagram of preset mark information according to an exemplary embodiment of the present application.

As shown in FIG. 5B, an image to be processed may be collected through the image collecting apparatus, and then the area where the signal light is located is framed therefrom to obtain preset mark information 51.

In a practical application, after receiving the image to be processed that is transmitted by the image collecting apparatus, the electronic device may perform, according to the preset mark information, cropping in the image to be processed that is received to obtain a target area including the signal light. The image of the target area may be used as an image including the signal light.

Figure 5C:
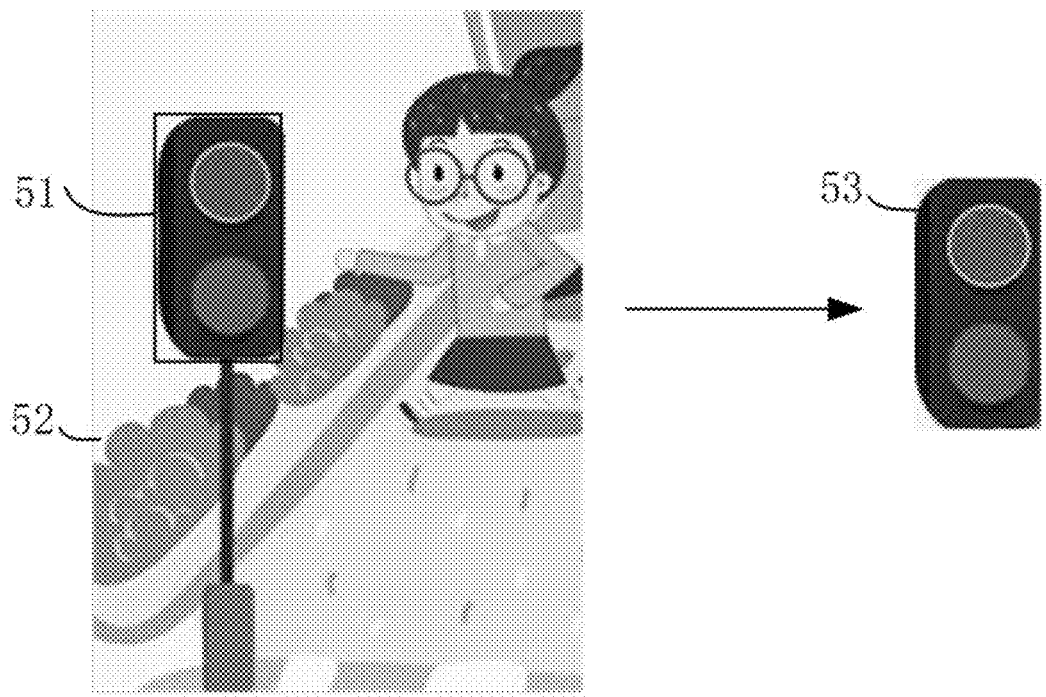
FIG. 5C is a schematic diagram of that an image including a signal light is cropped out of an image to be processed according to an exemplary embodiment of the present application.

FIG. 5C is a schematic diagram of that an image including a signal light is cropped out of an image to be processed according to an exemplary embodiment of the present application.

As shown in FIG. 5C, the image as indicated by 53 may be cropped out of the image 52 to be processed according to the preset mark information 51.

The electronic device may perform data processing according to the cropped image. In this implementation, the electronic device may be allowed to process the image that only includes the signal light to prevent the image from being over-sized so that there will be an excessive amount of data for processing when the electronic device performs identification.

Step 403, performing background modeling according to the N preceding frames of images of the current frame of image to determine the background image.

Where, according to the method provided in the present application, background modeling may be performed according to the N frames of images to obtain a background image. Therefore, the current frame of image collected subsequent to the N frames of images is processed according to the determined background image.

Specifically, the N frames of images described above may be processed based on the Gaussian mixture model or the vibe algorithm to obtain the background image. For such implementation where modeling is performed based on multiple frames of images to determine a background image, reference may be made to image data history so that the identification result is more accurate.

Further, the consecutive N frames of images may be consecutive images or images spaced by a preset number of frames. For example, modeling processing 0 is, performed on the $1^{-st}$, $2^{-nd}$, $3^{-rd}$, $4^{-th}$ . . . $N^{-th}$ frames of images, and modeling processing, may also be performed on the $1^{-st}$, $1+m^{-th}$, $1+2m^{-th}$ . . . $1+(N-1)*m^{-th}$ frames of images.

Step 404, determining, in the current frame of image, a matching area corresponding to the background image.

The current frame of image may be compared with the background image. Specifically, a matching area corresponding to the background image may be determined in the current frame of image, and then a comparison may be made.

Figure 5D:
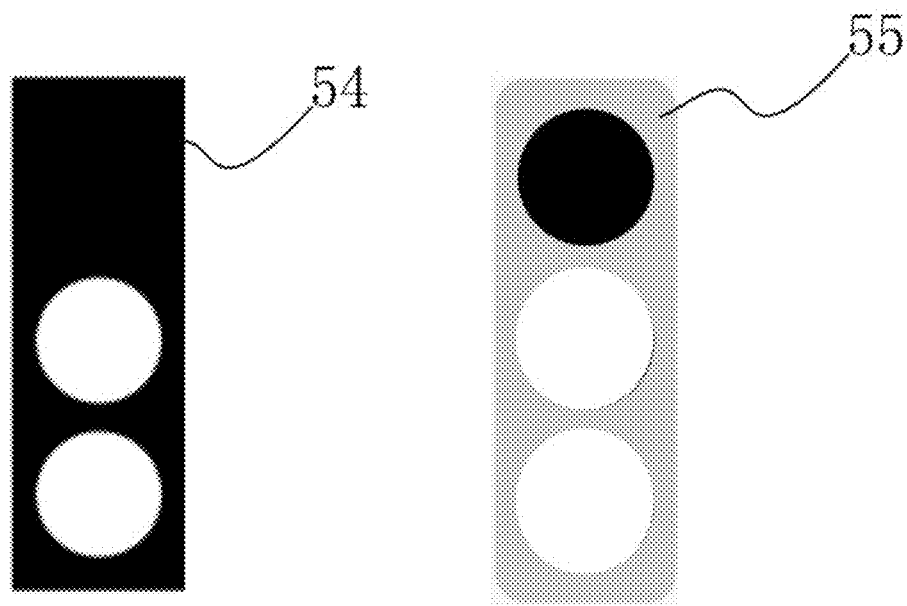
FIG. 5D is a schematic diagram of a matching area according to an exemplary embodiment of the present application.

FIG. 5D is a schematic diagram of a matching area according to an exemplary embodiment of the present application.

As shown in FIG. 5D, the identification result of the background image is indicated by 54 (black pixels represent pixels belonging to the background image). A matching area 55 may be determined in the current frame of image according to the background image.

Step 405, comparing the background image with the matching area, and determining, in the current frame of image, the moving foreground according to a comparison result.

The background image may be compared with the matching area; specifically, the comparison may be made pixel-wise. If a pixel in the matching area is inconsistent with a pixel in the background image with regard to pixel information, the pixel may be determined as a foreground pixel.

For example, values of pixels around a pixel (x, y) of the background image and values of previous pixels may be extracted to create a sample set of pixels, and then a value of a pixel at the current frame (x, y) is compared with a value of a pixel in the sample set. If its distance to the value of the pixel in the sample set is greater than a certain threshold, the pixel is considered to be a foreground pixel, otherwise it is a background pixel.

In such implementation, the moving foreground can be determined with a necessity to only detect whether the current frame of image has changed relative to the background image, and then whether the light color has changed is determined, so that the light color of the light that is turned on in the current frame of image may be determined according to the information whether the light color has changed. In this way, the light color of the light that is turned on in the current frame of image can be quickly determined with a necessity to only identify whether there is a moving foreground in the matching area of the current frame of image.

For example, if the moving foreground is determined in the matching area, it can be directly considered that the light color has changed, and a light color change process can also be preset, and then the light color of the light that is currently turned on in the signal light is predicted according to the light color change process. For example, when the signal light has the yellow light turned on, it is detected that the light color of the signal light has changed. At this point, it can be considered that the signal light is switched to red according to the light color change process.

Step 406, if the current frame of image has no moving foreground identified, determining, according to a light color of a light that was turned on in a preceding frame of image, the light color of the light that is turned on in the current frame of image.

Where, if a light holder is turned on for a long time and the light color of each light holder does not switch, the entire image may be identified as a background image, that is, no foreground is identified in the image.

For example, if the green light is turned on for 5 s, the green light that is turned on may also be determined as the background. At this point, the entire image is determined as the background image.

In this case, it can be considered that the light color of the signal light has not changed. Therefore, the light color of the light that was turned on in a preceding frame of image may be determined as the light color of the light that is turned on in the current frame of image.

In this implementation, it is possible to identify the light color of the light that is turned on in the current frame of image when the light color has not switched for a long time, thereby avoiding occurrence of a situation that no moving foreground is identified when the light color is not switched so that the light color cannot be determined.

Step 407, determining, according to a light holder position corresponding to the moving foreground in the current frame of image, the light color of the light that is turned on in the current frame of image, where information of the current frame of image includes light holder position information.

Specifically, if a moving foreground is determined in the current frame of image, a light holder position corresponding to the moving foreground may be determined according to the light holder position information of the signal light, and then the light color of the light that is turned on in the current frame of image is determined according to the light holder position.

Further, light holder mark information may be preset, and then the position of each light holder in the image may be determined according to the light holder mark information.

If the image collecting apparatus does not change in position and the signal light does not change in position, a light holder of the signal light in the image to be processed that is collected by the image collecting apparatus will not change in position. Therefore, light holder mark information may be preset to mark the area of each light holder of the signal light in the image to be processed.

Figure 5E:
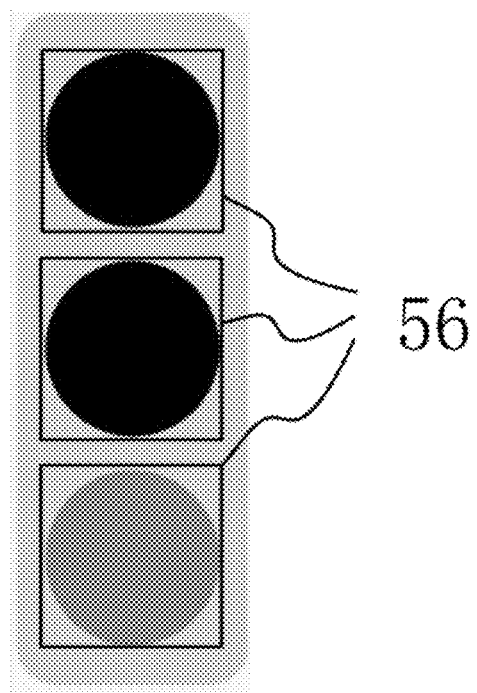
FIG. 5E is a schematic diagram of light holder mark information according to an exemplary embodiment of the present application.

FIG. 5E is a schematic diagram of light holder mark information according to an exemplary embodiment of the present application.

As shown in FIG. 5E, an image to be processed may be collected through the image collecting apparatus, and then the area where the light holder of the signal light is located is framed therefrom to obtain light holder mark information 56.

In a practical application, after the electronic device determines a moving foreground, the light holder position corresponding to the moving foreground may be determined by light holder mark information. For example, if the moving foreground covers a light holder position, or the area covered by the moving foreground belongs to the coverage of the light holder position, it can be considered that the moving foreground corresponds to the light holder position.

Where, if the moving foreground corresponds to a light holder position, it can be considered that the light holder at that position has a light color switching situation. In turn, the light color of the light that is turned on in the current frame of image can be determined based on this transition.

In this implementation, through the pre-marked light holder position, it is possible to determine, by means of background modeling, which light holder has a light color switching situation, and then to accurately determine which light holder is turned on and which light holder is turned off.

In an implementation, if two moving foregrounds corresponding to different light holder positions are identified in the current frame of image, the light color of the light that is turned on in the current frame of image is determined according to the light color of the light that was turned on in the preceding frame of image and a preset light color switching process.

Where, if two moving foregrounds corresponding to different light holder positions are identified in the current frame of image, it can be considered that one light holder of the signal light is turned on and the other light holder thereof is turn off. At this point, the light color of the light that was turned on in the preceding frame of image may be obtained, and it is considered that the light holder in that light color is turned off in the current frame of image, moreover, the light color of the light that is turned on in the signal light after the light in that light color is turned off is determined according to a preset light color switching process.

Figure 5F:
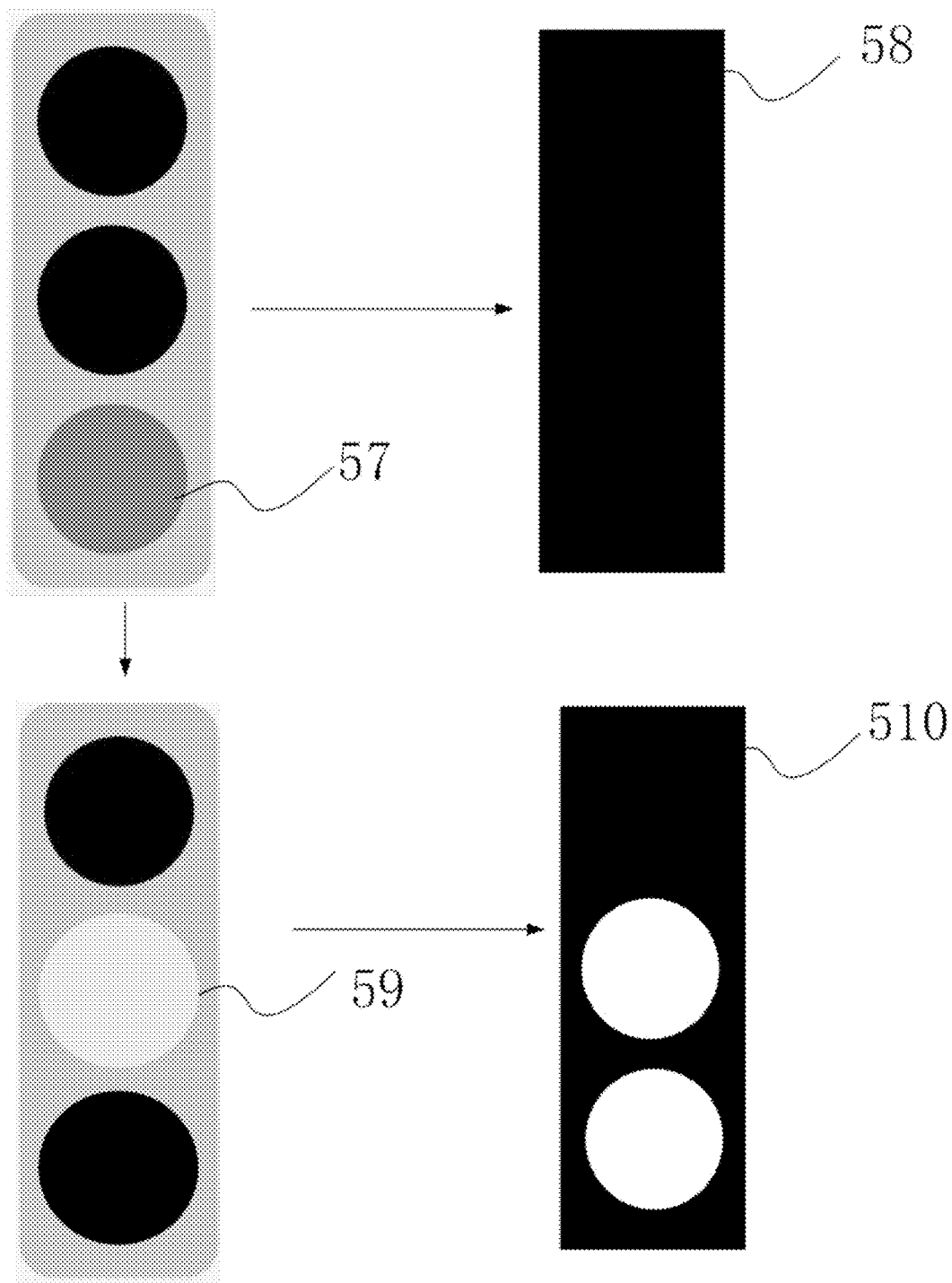
FIG. 5F is a schematic diagram of light color switching according to an exemplary embodiment of the present application.

FIG. 5F is a schematic diagram of light color switching according to an exemplary embodiment of the present application.

As shown in FIG. 5F, when the green light 57 of the signal light is turned on for a long time, the identification result of the background image is indicated by 58 (black pixels represent pixels belonging to the background image). When the green light 57 is turned off and the yellow light 59 is turned on, the moving foreground as indicated by 511 (white pixels represent pixels belonging to the moving foreground) can be obtained according to the determined background image 58 and the image with the light color change. At this point, two moving foregrounds can be identified, one moving foreground corresponds to the light holder position of the green light, and the other moving foreground corresponds to the light holder position of the yellow light.

Since there are moving foregrounds corresponding to two light holders, it can be considered that a light color switch has occurred in the signal light, where one light is turned off and the other light is turned on. It can be obtained that the light color of the light that was turned on in the preceding frame of image is green, based on the preset light color switching process, it can be known that the yellow light is turned on after the green light is turned off. Therefore, it can be determined that the light color of the light that is turned on in the current frame of image is yellow.

In this implementation, when two moving foregrounds are identified, the light color of the light that is turned on in the current frame of image can be determined according to the light color of the light that was turned on in the preceding frame of image and the preset light color switching process, so that the light color of the light that is turned on in the signal light can be determined when the signal light is switched among different light colors without modifying the signal machine or performing accelerated computing by the processor.

In an implementation, if one moving foreground corresponding to one light holder position is identified in the current frame of image, the light color of the light that is turned on in the current frame of image is determined according to the light color corresponding to the light holder position.

Where, if one moving foreground corresponding to one light holder position is identified in the current frame of image, it can be considered that one light holder of the signal light has a light color switching situation. At this point, it can be considered that the light is turned on at the light holder corresponding to that light holder position.

Figure 5G:
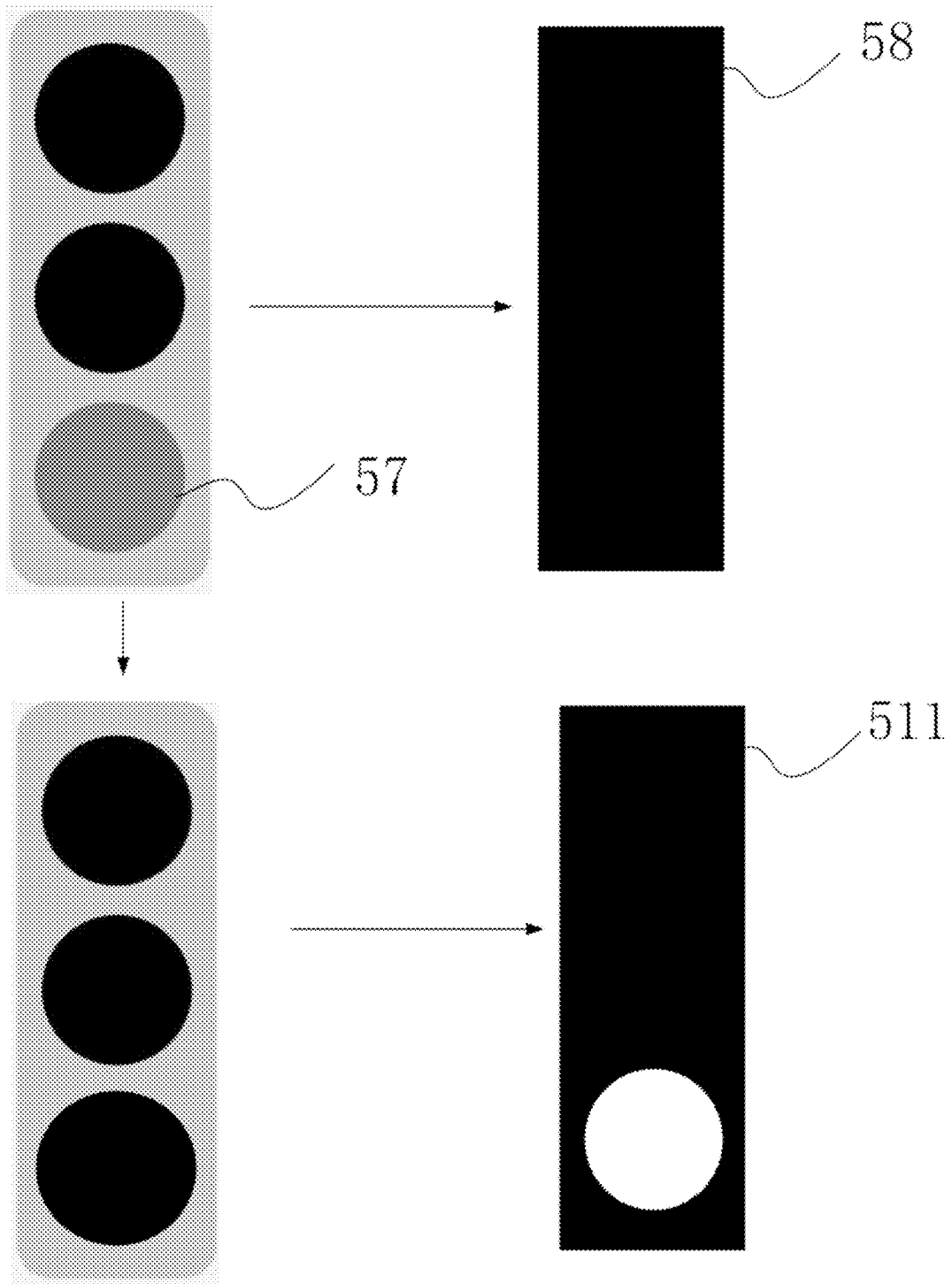
FIG. 5G is a schematic diagram of light color switching according to another exemplary embodiment of the present application.

FIG. 5G is a schematic diagram of light color switching according to another exemplary embodiment of the present application.

As shown in FIG. 5G, when the green light 57 of the signal light is turned on for a long time, the identification result of the background image is indicated by 58 (black pixels represent pixels belonging to the background image). When the green light 57 is turned off, the moving foreground as indicated by 511 (white pixels represent pixels belonging to the moving foreground) can be obtained according to this frame of image and the determined background image 58. At this point, one moving foreground can be identified and obtained, and the moving foreground corresponds to the light holder position of the green light. This situation is a process where the green light is switched to the yellow light. When the green light is switched from on to off, the yellow light has not been turned on. Therefore, it can be considered that the green light is still turned on currently.

Figure 5H:
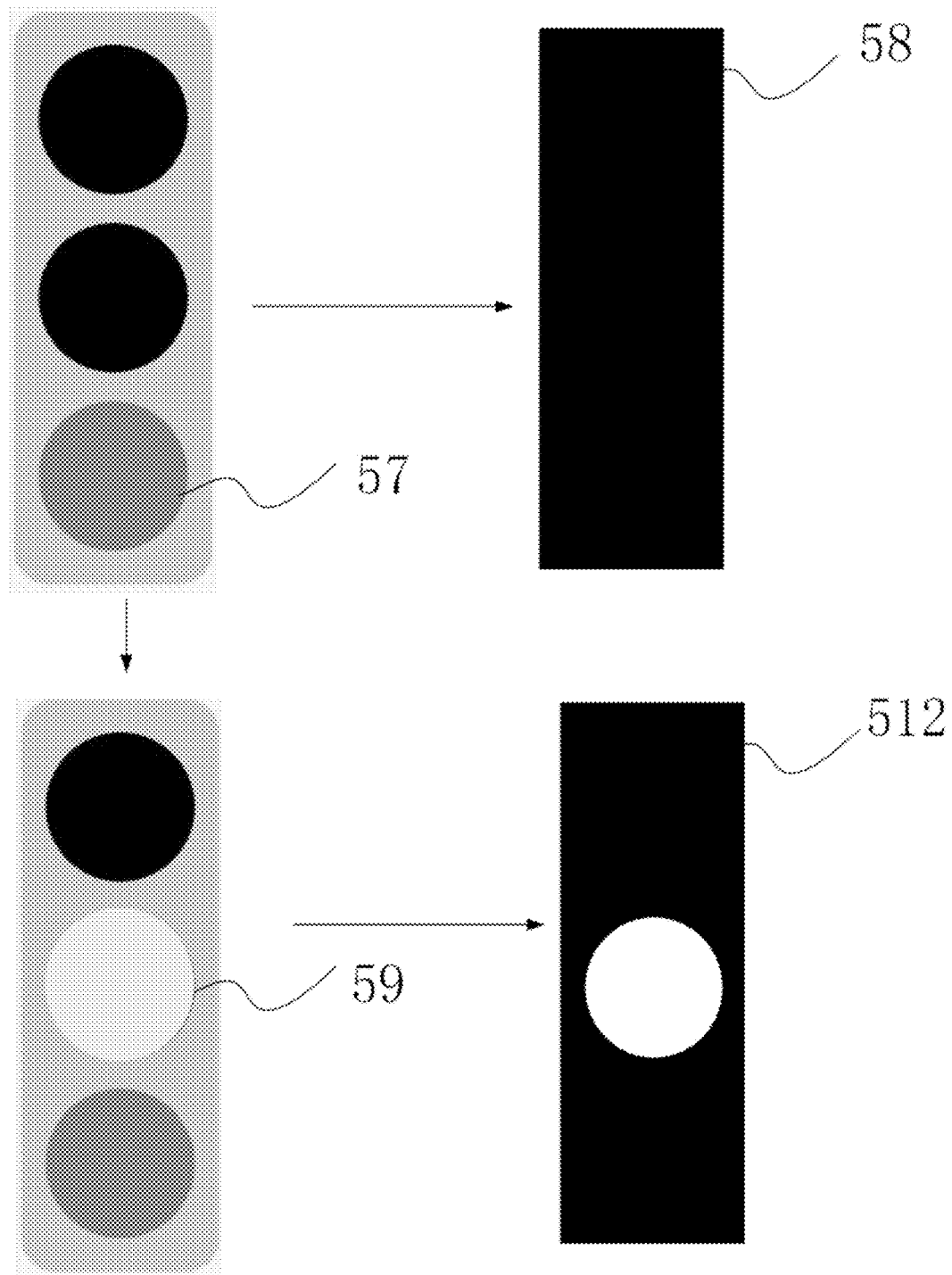
FIG. 5H is a schematic diagram of light color switching according to yet another exemplary embodiment of the present application.

FIG. 5H is a schematic diagram of light color switching according to yet another exemplary embodiment of the present application.

As shown in FIG. 5H, when the green light 57 of the signal light is turned on for a long time, the identification result of the background image is indicated by 58 (black pixels represent pixels belonging to the background image). When the green light 57 has not been turn off, but the yellow light 59 has been turned on, the identification result of the background image is indicated by 512 (black pixels represent pixels belonging to the background image). At this point, one moving foreground can be identified, and the moving foreground corresponds to the light holder position of the yellow light. This situation is a process where the green light is switched to the yellow light, the yellow light has already been turn on, and it can be considered that the light color of the light that is turned on in the current frame of image is yellow.

In this implementation, when one moving foreground is identified, the light color of the light that is turned on in the current frame of image is determined according to the light holder position corresponding to the moving foreground, so that the light color of the signal light that is turned on when different light holders are turned on simultaneously can be determined without modifying the signal machine or performing accelerated computing by the processor, also, the light color of the signal light that is turned on can be determined when the light color of the same light holder is switched.

Specifically, attribute information of the signal light may also be pre-marked. The attribute information may be, for example, the number of light holders of the signal light, or whether the light holders in the signal light being arranged horizontally or longitudinally. When the electronic device is performing light color identification, the light color of the signal light corresponding to the light holder position may be determined according to the attribute information.

Further, for example, attribute identifiers corresponding to signal lights with different attributes may be provided. For example, a horizontal signal light of two light holders is H2, a longitudinal signal light of two light holders is Z2, a horizontal signal light of three light holders is H3, and a longitudinal signal light of three light holders is Z3. The signal lights may be pre-marked with attribute identifiers, for example, if a signal light is marked as H3, the electronic device may determine light colors corresponding to light holders in different positions of the signal light according to the identifier H3.

This implementation enables the electronic device to identify a light color of a light that is turned on in different types of signal lights, so that the solution provided in the present application can be more widely used.

Figure 6:
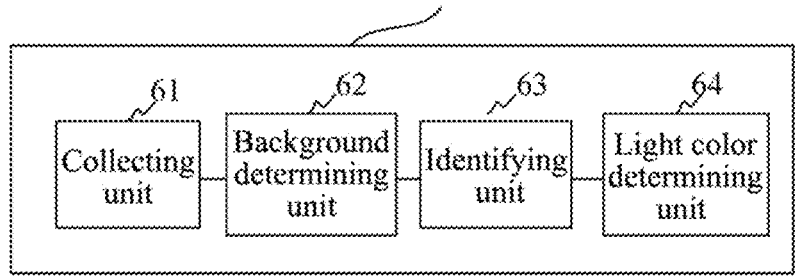
FIG. 6 is a structural diagram of a light color identifying apparatus of a signal light according to an exemplary embodiment of the present application.

FIG. 6 is a structural diagram of a light color identifying apparatus of a signal light according to an exemplary embodiment of the present application.

As shown in FIG. 6, the light color identifying apparatus of the signal light provided in this embodiment includes:
 a collecting unit 61, configured to collect an image including the signal light through an image collecting apparatus;
 a background determining unit 62, configured to determine a background image according to N preceding frames of images of a current frame of image, where N is a positive integer greater than or equal to 1;
 an identifying unit 63, configured to perform foreground identification on the current frame of image according to the background image to obtain a moving foreground, where the moving foreground represents a change of the current frame of image relative to the background image; and
 a light color determining unit 64, configured to determine, according to the moving foreground, a light color of a light that is turned on in the current frame of image.

The light color identifying apparatus of the signal light provided in the present application includes: a collecting unit, configured to collect an image including the signal light through an image collecting apparatus; a background determining unit, configured to determine a background image according to N preceding frames of images of a current frame of image, where N is a positive integer greater than or equal to 1; an identifying unit, configured to perform foreground identification on the current frame of image according to the background image to obtain a moving foreground, where the moving foreground represents a change of the current frame of image relative to the background image; and a light color determining unit, configured to determine, according to the moving foreground, a light color of a light that is turned on in the current frame of image. According to the apparatus provided in the present application, by means of identifying the foreground in the image, a light color identification problem may be converted into a foreground identification problem, so that the light color of the signal light can be identified without modifying the signal light or collecting a large amount of data for model training.

Figure 7:
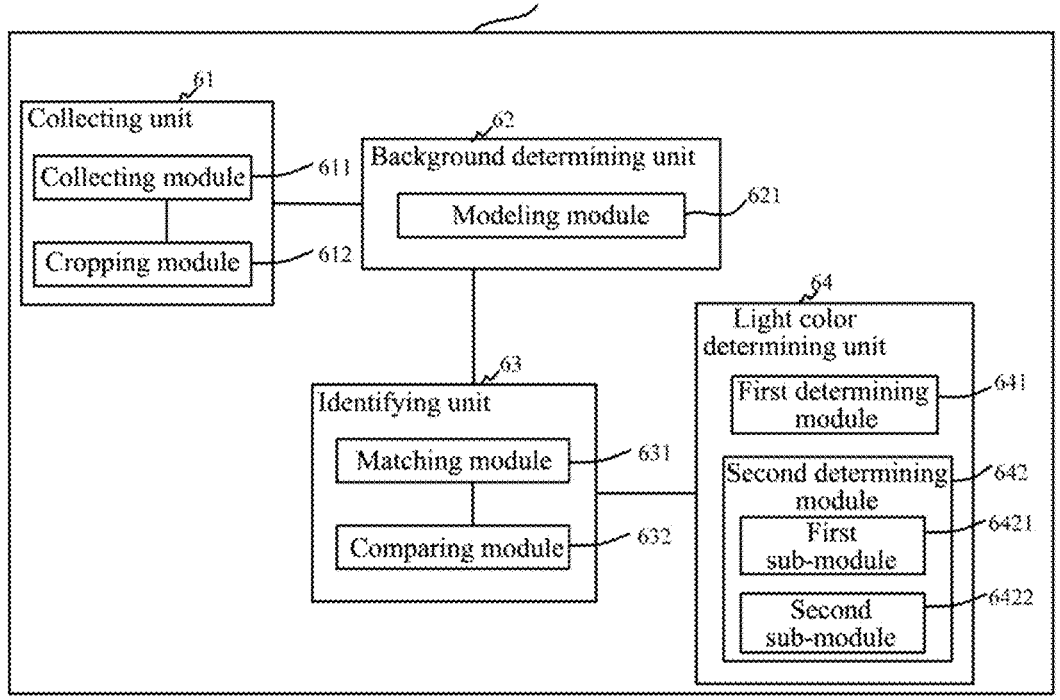
FIG. 7 is a structural diagram of a light color identifying apparatus of a signal light according to another exemplary embodiment of the present application.

FIG. 7 is a structural diagram of a light color identifying apparatus of a signal light according to another exemplary embodiment of the present application.

As shown in FIG. 7, on the basis of the embodiments described above, in the light color identifying apparatus of the signal light provided in this embodiment, the light color determining unit 64 includes:
 a first determining module 641, configured to, if the current frame of image has no moving foreground identified, determine, according to a light color of a light that was turned on in a preceding frame of image, the light color of the light that is turned on in the current frame of image.

Optionally, information of the current frame of image includes light holder position information; and
 the light color determining unit 64 includes:
 a second determining module 642, configured to determine, according to a light holder position corresponding to the moving foreground in the current frame of image, the light color of the light that is turned on in the current frame of image.

Optionally, the second determining module 642 includes:
 a first sub-module 6421, configured to, if two moving foregrounds corresponding to different light holder positions are identified in the current frame of image, determine, according to the light color of the light that was turned on in the preceding frame of image and a preset light color switching process, the light color of the light that is turned on in the current frame of image.

Optionally, the second determining module 642 includes:
 a second sub-module 6422, configured to, if one moving foreground corresponding to one light holder position is identified in the current frame of image, determine, according to the light color corresponding to the light holder position, the light color of the light that is turned on in the current frame of image.

Optionally, attribute information of the signal light is pre-marked, and the light color determining unit 64 is further configured to:
 determine the light color of the signal light corresponding to the light holder position according to the attribute information.

Optionally, the background determining unit 62 includes:
a modeling module 621, configured to perform background modeling according to the N preceding frames of images to determine the background image.

Optionally, the identifying unit 63 includes:
a matching module 631, configured to determine, in the current frame of image, a matching area corresponding to the background image; and
a comparing module 632, configured to compare the background image with the matching area, and determine, in the current frame of image, the moving foreground according to a comparison result.

Optionally, the collecting unit 61 includes:
a collecting module 611, configured to collect an image to be processed through the image collecting apparatus, optionally, the image to be processed includes a signal light; and
a cropping module 612, configured to crop, according to preset mark information, an image including the signal light out of the image to be processed.

According to an embodiment of the present application, the present application also provides an electronic device and a readable storage medium.

Figure 8:
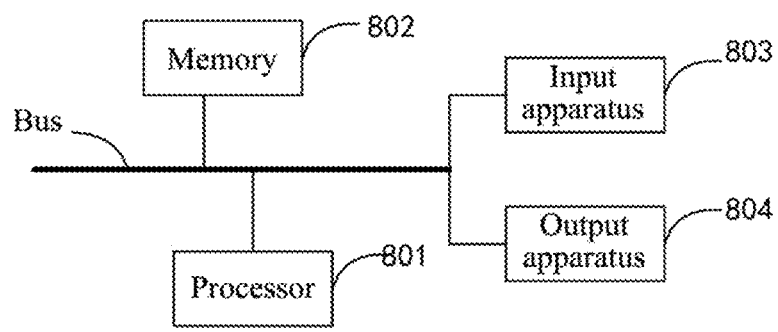
FIG. 8 is a block diagram of an electronic device according to an embodiment of the present application.

FIG. 8 is a block diagram of an electronic device according to an embodiment of the present application. The electronic device is intended to represent various forms of digital computers, such as a laptop computer, a desktop computer, a workbench, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. The components shown herein, their connections and relationships, and their functions are merely used as examples, and are not intended to limit implementations in the present application described and/or claimed herein.

According to an embodiment of the present application, the present application also provides a roadside device, which includes the electronic device provided in FIG. 8.

The roadside device includes, for example, a roadside sensing device with a computing function and a roadside computing device connected to the roadside sensing device.

In a vehicle-road collaborative system architecture for intelligent transportation, a roadside device includes a roadside sensing device and a roadside computing device, where the roadside sensing device (such as a roadside camera) is connected to the roadside computing device (such as a roadside computing unit RSCU), and the roadside computing device is connected to a server device which may communicate with an autonomous driving or assisted driving vehicle in various ways. In another system architecture, the roadside sensing device itself includes a computing function, then the roadside sensing device is connected directly to the server device. The above connection may be wired or wireless. In the present application, the server device is, for example, a cloud control platform, a vehicle-road collaborative management platform, a central subsystem, an edge computing platform, a cloud computing platform, etc.

As shown in FIG. 8, the electronic device includes: one or more processors 801, a memory 802, and an interface for connecting various components, including a high-speed interface and a low-speed interface. The various components are connected to each other via different buses, and can be installed on a public motherboard or installed in other ways as desired. The processor may process instructions executed within the electronic device, including instructions that are stored in or on the memory to display GUI graphical information on an external input/output apparatus (such as a display device coupled to the interface). In other implementations, multiple processors and/or multiple buses can be used together with multiple memories, if desired. Similarly, multiple electronic devices can be connected, and each device provides some necessary operations (for example, as a server array, a group of blade servers, or a multi-processor system). In FIG. 8, one processor 801 is used as an example.

The memory 802 is a non-transitory computer readable storage medium provided in the present application. Where the memory has stored therein instructions executable by at least one processor, enabling the at least one processor to execute the light color identifying method of the signal light provided in the present application. The non-transitory computer readable storage medium of the present application has stored therein computer instructions which are configured to enable a computer to execute the light color identifying method of the signal light provided in the present application.

As a kind of non-transitory computer readable storage medium, the memory 802 may be configured to store non-transitory software programs, non-transitory computer executable programs and modules, such as program instructions/modules (such as the collecting unit 61, the background determining unit 62, the identifying unit 63 and the light color determining unit 64 as shown in FIG. 6) corresponding to the light color identifying method of the signal light in the embodiment of the present application. The processor 801 executes various functional applications and data processing of the server by running the non-transitory software programs, instructions, and modules stored in the memory 802, that is, achieving the light color identifying method of the signal light in the above method embodiments.

The memory 802 may include a program storage area and a data storage area, where the program storage area may be stored with an operating system and an application program required by at least one function, the data storage area may be stored with data created according to use of the electronic device, and so on. In addition, the memory 802 may include a high-speed random access memory, and may also include a non-transitory memory, such as at least one magnetic disk storage device, a flash memory device, or other non-transitory solid-state storage devices. In some embodiments, the memory 802 optionally includes memories remotely arranged relative to the processor 801, and these remote memories can be connected to the electronic device through a network. Examples of the above network include, but are not limited to, Internet, an intranet, a local area network, a mobile communication network, and combinations thereof.

The electronic device may also include: an input apparatus 803 and an output apparatus 804. The processor 801, the memory 802, the input apparatus 803 and the output apparatus 804 can be connected by a bus or in other ways. In FIG. 8, connections via buses are used as an example.

The input apparatus 803 may receive input digital or character information, and generate key signal input related to user settings and function control of the electronic device, such as a touch screen, a keypad, a mouse, a trackpad, a touchpad, an indicator bar, one or more mouse buttons, a trackball, a joystick and other input apparatuses. The output apparatus 804 may include a display device, an auxiliary lighting apparatus (e.g., an LED), a tactile feedback apparatus (e.g., a vibration motor), and so on. The display device may include, but is not limited to, a liquid crystal display (LCD), a light emitting diode (LED) display, and a plasma display. In some implementations, the display device may be the touch screen.

Various implementations of the system and the technique described here may be implemented in a digital electronic circuit system, an integrated circuit system, an ASIC (application specific integrated circuit), computer hardware, firmware, software, and/or combinations thereof. These various implementations may include: implementations implemented in one or more computer programs, where the one or more computer programs may be executed and/or interpreted on a programmable system including at least one programmable processor, and the programmable processor may be a dedicated or generic programmable processor, which may receive data and instructions from a storage system, at least one input apparatus and at least one output apparatus, and transmit the data and the instructions to the storage system, the at least one input apparatus and the at least one output apparatus.

These computer programs (also known as programs, software, software applications, or codes) include machine instructions of the programmable processor, and may be implemented using a high-level process and/or an object-oriented programming language, and/or an assembly/machine language. As used herein, the terms "machine readable medium" and "computer readable medium" refer to any computer program product, device, and/or apparatus (e.g., a magnetic disk, an optical disk, a memory, a programmable logic device (PLD)) configured to provide machine instructions and/or data to the programmable processor, including a machine readable medium that receives machine instructions as machine readable signals. The term "machine readable signal" refers to any signal configured to provide machine instructions and/or data to the programmable processor.

For providing interaction with a user, the system and the technique described herein may be implemented on a computer, and the computer has: a display apparatus for displaying information to the user (such as a CRT (cathode ray tube) or an LCD (liquid crystal display) monitor); and a keyboard and a pointing apparatus (such as a mouse or a trackball), and the user may provide an input to the computer through the keyboard and the pointing apparatus. Other kinds of apparatuses may also be used to provide the interaction with the user; for example, feedback provided to the user may be any form of sensor feedback (e.g., visual feedback, auditory feedback, or tactile feedback); and may receive the input from the user in any form (including an acoustic input, a voice input, or a tactile input).

The system and the technique described herein may be implemented in a computing system that includes back-end components (for example, as a data server), or a computing system that includes intermediate components (for example, an application server), or a computing system that includes front-end components (for example, a user computer with a graphical user interface or a web browser, through which the user may interact with the implementations of the system and the technique described herein), or a computing system that includes any combination of the back-end components, the intermediate components, or the front-end components. The components of the system may be interconnected by any form or medium of digital data communications (e.g., a communication network). Examples of the communication network include: a local area network (LAN), a wide area network (WAN), and Internet.

The computing system may include a client and a server. The client and the server are generally far away from each other, and generally interact with each other through the communication network. A relationship between the client and the server is generated by computer programs running on a corresponding computer and having a client-server relationship for each other.

It should be understood that by using the various forms of procedures shown above, reordering, addition, or deletion of the step can be performed. For example, the steps recorded in the present application can be performed concurrently, sequentially, or in a different order, provided that desirable results of the technical solutions disclosed in the present application could be achieved, which is not limited herein.

The above specific implementations do not constitute a limitation on the protection scope of the present application. Those skilled in the art should understand that various modifications, combinations, sub-combinations, and replacements can be made according to design requirements and other factors. Any modification, equivalent replacement and improvement, etc., made within the spirit and principle of the present application shall be included in the protection scope of the present application.

What is claimed is:

1. A light color identifying method of a signal light, comprising:
    collecting an image comprising the signal light through an image collecting apparatus;
    determining a background image according to N preceding frames of images of a current frame of image, wherein N is a positive integer greater than or equal to 1;
    performing foreground identification on the current frame of image according to the background image to obtain a moving foreground, wherein the moving foreground represents a change of the current frame of image relative to the background image; and
    determining, according to the moving foreground, a light color of a light that is turned on in the current frame of image;
    wherein the determining, according to the moving foreground, the light color of the light that is turned on in the current frame of image comprises:
    when the current frame of image has no moving foreground identified, determining, according to a light color of a light that was turned on in a preceding frame of image, the light color of the light that is turned on in the current frame of image;
    wherein information of the current frame of image comprises light holder position information; and
    the determining, according to the moving foreground, the light color of the light that is turned on in the current frame of image further comprises:
    determining, according to a light holder position corresponding to the moving foreground in the current frame of image, the light color of the light that is turned on in the current frame of image; and
    wherein the determining, according to the light holder position corresponding to the moving foreground in the current frame of image, the light color of the light that is turned on in the current frame of image comprises:
    when two moving foregrounds corresponding to different light holder positions are identified in the current frame of image, determining, according to the light color of the light that was turned on in the preceding frame of image and a preset light color switching process, the light color of the light that is turned on in the current frame of image.

2. The method according to claim 1, wherein the determining, according to the light holder position corresponding to the moving foreground in the current frame of image, the light color of the light that is turned on in the current frame of image further comprises:

when one moving foreground corresponding to one light holder position is identified in the current frame of image, determining, according to the light color corresponding to the light holder position, the light color of the light that is turned on in the current frame of image.

3. The method according to claim 1, wherein attribute information of the signal light is pre-marked, and the method further comprises:

determining the light color of the signal light corresponding to the light holder position according to the attribute information.

4. The method according to claim 1, wherein the determining the background image according to the N preceding frames of images of the current frame of image comprises:

performing background modeling according to the N preceding frames of images to determine the background image.

5. The method according to claim 1, wherein the performing the foreground identification on the current frame of image according to the background image to obtain the moving foreground comprises:

determining, in the current frame of image, a matching area corresponding to the background image; and comparing the background image with the matching area, and determining, in the current frame of image, the moving foreground according to a comparison result.

6. The method according to claim 1, wherein the collecting the image comprising the signal light through the image collecting apparatus comprises:

collecting an image to be processed through the image collecting apparatus, wherein the image to be processed comprises a signal light; and cropping, according to preset mark information, an image comprising the signal light out of the image to be processed.

7. A light color identifying apparatus of a signal light, comprising:

at least one processor; and a memory communicatively connected to the at least one processor;

wherein the memory has stored therein instructions executable by the at least one processor, and the instructions are executed by the at least one processor to enable the at least one processor to:

collect an image comprising the signal light through an image collecting apparatus;

determine a background image according to N preceding frames of images of a current frame of image, wherein N is a positive integer greater than or equal to 1;

perform foreground identification on the current frame of image according to the background image to obtain a moving foreground, wherein the moving foreground represents a change of the current frame of image relative to the background image; and determine, according to the moving foreground, a light color of a light that is turned on in the current frame of image, wherein information of the current frame of image comprises light holder position information;

when the current frame of image has no moving foreground identified, determine, according to a light color of a light that was turned on in a preceding frame of image, the light color of the light that is turned on in the current frame of image; and determine, according to a light holder position corresponding to the moving foreground in the current frame of image, the light color of the light that is turned on in the current frame of image;

when two moving foregrounds corresponding to different light holder positions are identified in the current frame of image, determine, according to the light color of the light that was turned on in the preceding frame of image and a preset light color switching process, the light color of the light that is turned on in the current frame of image.

8. The apparatus according to claim 7, wherein the instructions further enable the at least one processor to:

when one moving foreground corresponding to one light holder position is identified in the current frame of image, determine, according to the light color corresponding to the light holder position, the light color of the light that is turned on in the current frame of image.

9. The apparatus according to claim 7, wherein the instructions further enable the at least one processor to:

determine the light color of the signal light corresponding to the light holder position according to the attribute information.

10. The apparatus according to claim 7, wherein the instructions further enable the at least one processor to:

perform background modeling according to the N preceding frames of images to determine the background image.

11. The apparatus according to claim 7, wherein the instructions further enable the at least one processor to:

determine, in the current frame of image, a matching area corresponding to the background image; and compare the background image with the matching area, and determine, in the current frame of image, the moving foreground according to a comparison result.

12. The apparatus according to claim 7, wherein the instructions further enable the at least one processor to:

collect an image to be processed through the image collecting apparatus, wherein the image to be processed comprises a signal light; and crop, according to preset mark information, an image comprising the signal light out of the image to be processed.

13. A non-transitory computer readable storage medium having stored therein computer instructions for causing a computer to:

collect an image comprising the signal light through an image collecting apparatus;

determine a background image according to N preceding frames of images of a current frame of image, wherein N is a positive integer greater than or equal to 1;

perform foreground identification on the current frame of image according to the background image to obtain a moving foreground, wherein the moving foreground represents a change of the current frame of image relative to the background image; and determine, according to the moving foreground, a light color of a light that is turned on in the current frame of image, wherein the determining, according to the moving foreground, the light color of the light that is turned on in the current frame of image comprises:

when the current frame of image has no moving foreground identified, determining, according to a light color of a light that was turned on in a preceding frame of image, the light color of the light that is turned on in the current frame of image;

wherein information of the current frame of image comprises light holder position information; and the determining, according to the moving foreground, the light color of the light that is turned on in the current frame of image comprises:

determining, according to a light holder position corresponding to the moving foreground in the current frame of image, the light color of the light that is turned on in the current frame of image; and wherein the determining, according to the light holder position corresponding to the moving foreground in the current frame of image, the light color of the light that is turned on in the current frame of image comprises:

when two moving foregrounds corresponding to different light holder positions are identified in the current frame of image, determining, according to the light color of the light that was turned on in the preceding frame of image and a preset light color switching process, the light color of the light that is turned on in the current frame of image.

14. A roadside device, comprising: the apparatus according to claim 7.

\* \* \* \* \*